(12) United States Patent
Medles et al.

(10) Patent No.: US 11,259,309 B2
(45) Date of Patent: Feb. 22, 2022

(54) METHOD AND APPARATUS FOR REPORTING HYBRID AUTOMATIC REPEAT REQUEST-ACKNOWLEDGEMENT INFORMATION IN MOBILE COMMUNICATIONS

(71) Applicant: MediaTek Singapore Pte. Ltd., Singapore (SG)

(72) Inventors: Abdelkader Medles, Cambridge (GB); Sylvio Paul Mathieu Bardes, Cambridge (GB); Xiu-Sheng Li, Hsinchu (TW)

(73) Assignee: MediaTek Singapore Pte. Ltd., Singapore (SG)

(*) Notice: Subject to any disclaimer, the term of this patent is extended or adjusted under 35 U.S.C. 154(b) by 407 days.

(21) Appl. No.: 16/365,955

(22) Filed: Mar. 27, 2019

(65) Prior Publication Data

US 2019/0306865 A1 Oct. 3, 2019

Related U.S. Application Data

(60) Provisional application No. 62/650,460, filed on Mar. 30, 2018.

(51) Int. Cl.
*H04W 72/04* (2009.01)
*H04L 5/00* (2006.01)
(Continued)

(52) U.S. Cl.
CPC ....... *H04W 72/0493* (2013.01); *H04L 1/1819* (2013.01); *H04L 5/0055* (2013.01);
(Continued)

(58) Field of Classification Search
CPC .......... H04W 72/0493; H04W 72/042; H04W 72/0446; H04W 8/22; H04L 5/0055; H04L 1/1819; H04L 1/1825; H04L 5/0094
See application file for complete search history.

(56) References Cited

U.S. PATENT DOCUMENTS

| 2015/0003311 A1* | 1/2015 | Feuersaenger ...... H04W 72/042 370/311 |
| 2015/0195819 A1* | 7/2015 | Kwon ................. H04W 72/085 370/329 |

(Continued)

FOREIGN PATENT DOCUMENTS

| CN | 102577215 A | 7/2012 | |
| CN | 106301670 A | 1/2017 | |
| WO | WO-2019157655 A1 * | 8/2019 | ........ H04W 72/1273 |

OTHER PUBLICATIONS

China National Intellectual Property Administration, International Search Report and Written Opinion for International Patent Application No. PCT/CN2019/080538, dated Jul. 8, 2019.

(Continued)

*Primary Examiner* — Mounir Moutaouakil
(74) *Attorney, Agent, or Firm* — Han IP PLLC; Andy M. Han

(57) ABSTRACT

Various solutions for reporting hybrid automatic repeat request-acknowledgement (HARQ-ACK) information with respect to user equipment and network apparatus in mobile communications are described. An apparatus may receive a first downlink control information (DCI) format indicating a first resource of physical uplink control channel (PUCCH) transmission. The apparatus may receive a second DCI format indicating a second resource of PUCCH transmission. The apparatus may determine that the receiving of the second DCI format is not earlier than a timing threshold (Continued)

from the first resource. The apparatus may cancel multiplexing of hybrid automatic repeat request-acknowledgement (HARQ-ACK) information corresponding to the second DCI format in the PUCCH transmission.

20 Claims, 5 Drawing Sheets

(51) Int. Cl.
    *H04W 8/22* (2009.01)
    *H04L 1/18* (2006.01)
(52) U.S. Cl.
    CPC .......... *H04W 8/22* (2013.01); *H04W 72/042* (2013.01); *H04W 72/0446* (2013.01)

(56) References Cited

U.S. PATENT DOCUMENTS

| | | | | |
|---|---|---|---|---|
| 2015/0341912 | A1* | 11/2015 | Kim | .................. H04L 5/0044 370/329 |
| 2016/0212734 | A1* | 7/2016 | He | .................. H04L 1/1861 |
| 2018/0019843 | A1* | 1/2018 | Papasakellariou | .......................... H04W 72/1278 |
| 2018/0145796 | A1* | 5/2018 | Liang | .................. H04L 1/1861 |
| 2019/0223205 | A1* | 7/2019 | Papasakellariou | ........ H04L 5/00 |
| 2019/0254009 | A1* | 8/2019 | Hwang | ............. H04W 72/1205 |
| 2019/0280820 | A1* | 9/2019 | Kim | .................... H04W 74/008 |
| 2019/0363840 | A1* | 11/2019 | Wang | .................... H04L 1/1822 |
| 2019/0393994 | A1* | 12/2019 | Liang | .................... H04L 1/1678 |

OTHER PUBLICATIONS

Qualcomm Incorporated, Summary for Rel-15 DL/UL data scheduling and HARQ procedure, 3GPP TSG-RAN WG1 Meeting #94bis, R1-1811958, Oct. 12, 2018.

Intel Corporation, Remaining details on processing and switching times in NR, 3GPP TSG RAN WG1 Meeting AH 1801, R1-1800333, Jan. 26, 2018.

Huawei et al., Summary of remaining issues on HARQ management, 3GPP TSG RAN WG1 Meeting Ad Hoc, R1-1800036, Jan. 26, 2018.

* cited by examiner

METHOD AND APPARATUS FOR REPORTING HYBRID AUTOMATIC REPEAT REQUEST-ACKNOWLEDGEMENT INFORMATION IN MOBILE COMMUNICATIONS

CROSS REFERENCE TO RELATED PATENT APPLICATION(S)

The present disclosure is part of a non-provisional application claiming the priority benefit of U.S. Patent Application No. 62/650,460, filed on 30 Mar. 2018, the content of which is incorporated by reference in its entirety.

TECHNICAL FIELD

The present disclosure is generally related to mobile communications and, more particularly, to procedures for reporting hybrid automatic repeat request-acknowledgement (HARQ-ACK) information with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), HARQ-ACK information transmission is introduced to improve transmission reliability. The user equipment (UE) needs to report HARQ-ACK information for corresponding downlink receptions in a HARQ-ACK codebook. The HARQ-ACK codebook should be transmitted in a slot indicated by a value of a HARQ feedback timing indicator field in a corresponding downlink control information (DCI) format. The DCI format should also indicate the physical uplink control channel (PUCCH) resource scheduled for the HARQ-ACK information transmission. Generally, the UE may need a period of time for processing the downlink information (e.g., physical downlink control channel (PDCCH) or physical downlink shared channel (PDSCH)) and preparing the HARQ-ACK information. Therefore, the DCI format should be received earlier enough before the scheduled PUCCH resource.

HARQ-ACK multiplexing can be used to facilitate HARQ-ACK information transmission. Multiple HARQ-ACK feedbacks corresponding to multiple PDSCH transmissions may be multiplexed and transmitted to the network apparatus at once. One PUCCH resource may be used to carry multiple HARQ-ACK feedbacks to be transmitted in the same slot. The PUCCH resource may be changed due to the HARQ-ACK multiplexing. For example, another PUCCH resource with larger capacity may be configured for larger uplink control information payload size. However, the adaptation of the PUCCH resource may change transmission time of the PUCCH. Without proper configurations or restrictions, the UE may not have enough time for processing the downlink information and preparing the HARQ-ACK information.

Accordingly, in order to reserve enough processing time for the UE to process the downlink information and prepare the HARQ-ACK information, a timing deadline should be defined for the adaptation of the PUCCH resource. It is needed to provide proper procedures for reporting HARQ-ACK information.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to procedures for reporting HARQ-ACK information with respect to user equipment and network apparatus in mobile communications.

In one aspect, a method may involve an apparatus receiving a first DCI format indicating a first resource of PUCCH transmission. The method may also involve the apparatus receiving a second DCI format indicating a second resource of PUCCH transmission. The method may further involve the apparatus determining that the receiving of the second DCI format is not earlier than a timing threshold from the first resource. The method may further involve the apparatus cancelling multiplexing of HARQ-ACK information corresponding to the second DCI format in the PUCCH transmission.

In one aspect, an apparatus may comprise a transceiver capable of wirelessly communicating with a network node of a wireless network. The apparatus may also comprise a processor communicatively coupled to the transceiver. The processor may be capable of receiving, via the transceiver, a first DCI format indicating a first resource of PUCCH transmission. The processor may also be capable of receiving, via the transceiver, a second DCI format indicating a second resource of PUCCH transmission. The processor may further be capable of determining that the receiving of the second DCI format is not earlier than a timing threshold from the first resource. The processor may further be capable of cancelling multiplexing of HARQ-ACK information corresponding to the second DCI format in the PUCCH transmission.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to procedures for reporting HARQ-ACK information with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, HARQ-ACK information transmission is introduced to improve transmission reliability. The UE needs to report HARQ-ACK information for corresponding downlink receptions in a HARQ-ACK codebook. The HARQ-ACK codebook should be transmitted in a slot indicated by a value of a HARQ feedback timing indicator field in a corresponding DCI format. The DCI format should also indicate the PUCCH resource scheduled for the HARQ-ACK information transmission. Generally, the UE may need a period of time for processing the downlink information (e.g., PDCCH or PDSCH) and preparing the HARQ-ACK information. Therefore, the DCI format should be received earlier enough before the scheduled PUCCH resource.

HARQ-ACK multiplexing can be used to facilitate HARQ-ACK information transmission. Multiple HARQ-ACK feedbacks corresponding to multiple PDSCH transmissions may be multiplexed and transmitted to the network apparatus at once. One PUCCH resource may be used to carry multiple HARQ-ACK feedbacks to be transmitted in the same slot. The PUCCH resource may be changed due to the HARQ-ACK multiplexing. For example, another PUCCH resource with larger capacity may be configured for larger uplink control information payload size. However, the adaptation of the PUCCH resource may change transmission time of the PUCCH. Without proper configurations or restrictions, the UE may not have enough time for processing the downlink information and preparing the HARQ-ACK information.

Figure 1:
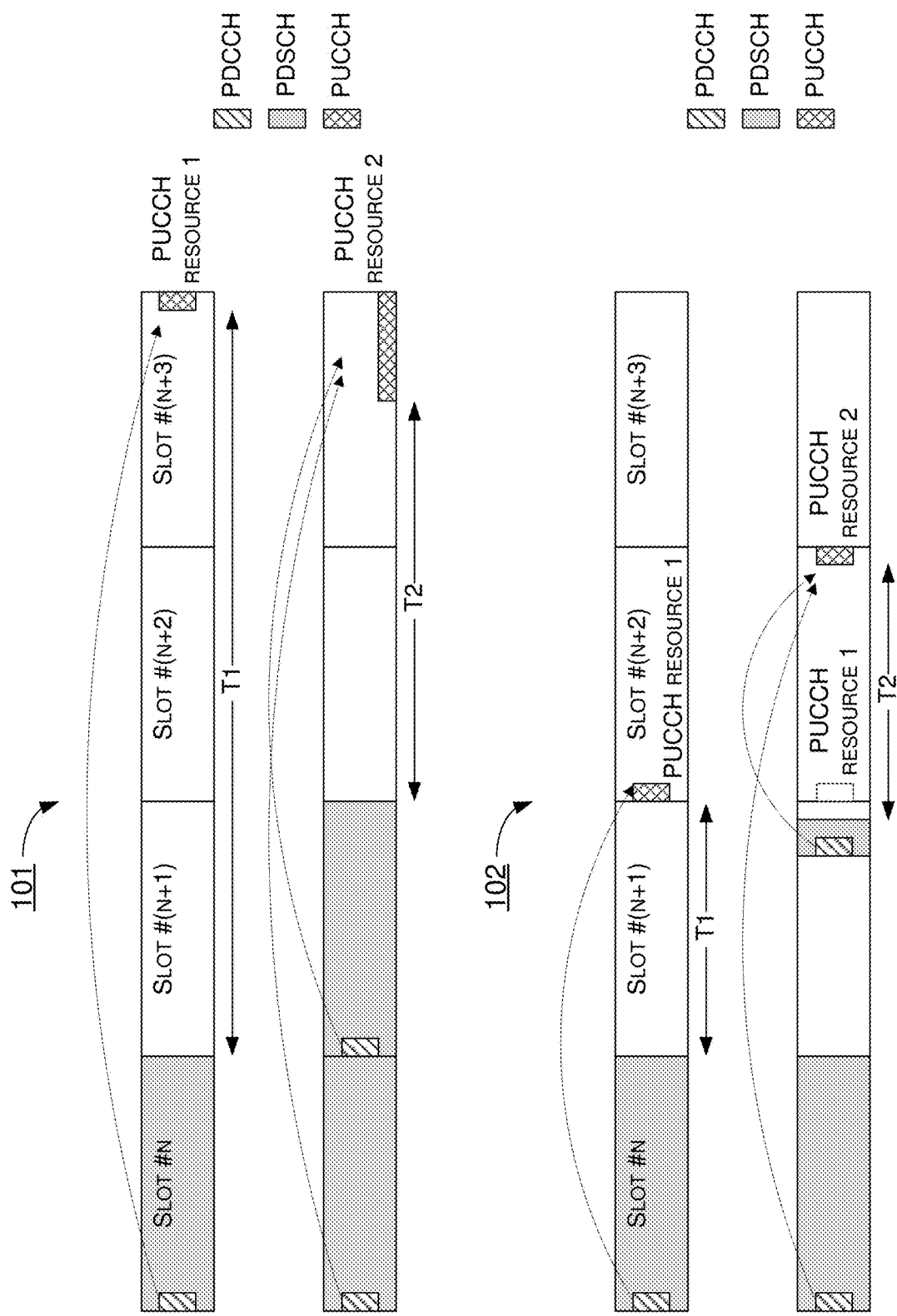
FIG. 1 is a diagram depicting example scenarios under schemes in accordance with implementations of the present disclosure.

FIG. 1 illustrates an example scenarios 101 and 102 under schemes in accordance with implementations of the present disclosure. Scenarios 101 and 102 involves a UE and a network apparatus, which may be a part of a wireless communication network (e.g., an LTE network, an LTE-Advanced network, an LTE-Advanced Pro network, a 5G network, an NR network, an IoT network or an NB-IoT network). In scenario 101, the network apparatus may be configured to transmit the first PDCCH in slot #n to schedule the first PDSCH in slot #n and the first PUCCH resource (e.g. PUCCH resource 1) in slot #(n+3). The time period (e.g., T1) between the last symbol of the first PDSCH and the first symbol of the first PUCCH resource should be long enough for the UE to process the downlink information (e.g., the first PDCCH and the first PDSCH) and prepare the HARQ-ACK information.

However, the network apparatus may further transmit the second PDCCH in slot #(n+1) to schedule the second PDSCH in slot #(n+1) and the second PUCCH resource (e.g. PUCCH resource 2) in slot #(n+3). The PUCCH resource may be changed for multiplexing the HARQ-ACK information corresponding to the first PDSCH in slot #n and the second PDSCH in slot #(n+1). The adaptation of the PUCCH resource may advance the transmission time of the PUCCH. In addition, the UE may further need to process the downlink information in slot #(n+1) (e.g., the second PDCCH and the second PDSCH). Therefore, the time period (e.g., T2) between the last symbol of the second PDSCH in slot #(n+1) and the first symbol of the second PUCCH resource may be shortened. The shortened time period (e.g., T2) may not provide enough time for the UE to prepare the HARQ-ACK information. Accordingly, the UE may not have enough processing time and may not be able to transmit the HARQ-ACK information in the second PUCCH resource. The UE may have difficulty for reporting HARQ-ACK information under such scenario.

In scenario 102, the network apparatus may be configured to transmit the first PDCCH in slot #n to schedule the first PDSCH in slot #n and the first PUCCH resource (e.g. PUCCH resource 1) in slot #(n+2). The time period (e.g., T1) between the last symbol of the first P DSCH and the first symbol of the first PUCCH resource should be long enough for the UE to process the downlink information (e.g., the first PDCCH and the first PDSCH) and prepare the HARQ-ACK information. However, the network apparatus may further transmit the second PDCCH in slot #(n+1) to schedule the second PDSCH in slot #(n+1) and the second PUCCH resource (e.g. PUCCH resource 2) in slot #(n+2). The second PDCCH and the second PDSCH may be close to the first PUCCH resource. Since the UE still needs some time to process the second PDCCH and the second PDSCH, the UE may be aware of the second PDCCH after the transmission of the first PUCCH resource. Accordingly, the UE may not have enough time to process the downlink information in slot #(n+1) and multiplex the HARQ-ACK information corresponding to the second PDSCH to the second PUCCH resource. The UE may have difficulty for reporting HARQ-ACK information under such scenario.

In view of the above, the present disclosure proposes a number of schemes regarding procedures for reporting HARQ-ACK information with respect to the UE and the network apparatus. According to the schemes of the present disclosure, the network apparatus may be configured to guarantee the processing time needed for the UE to process the downlink information and prepare the HARQ-ACK information. On the other hand, the UE may be able to deal with the HARQ-ACK multiplexing even when the processing time is not long enough.

Figure 2:
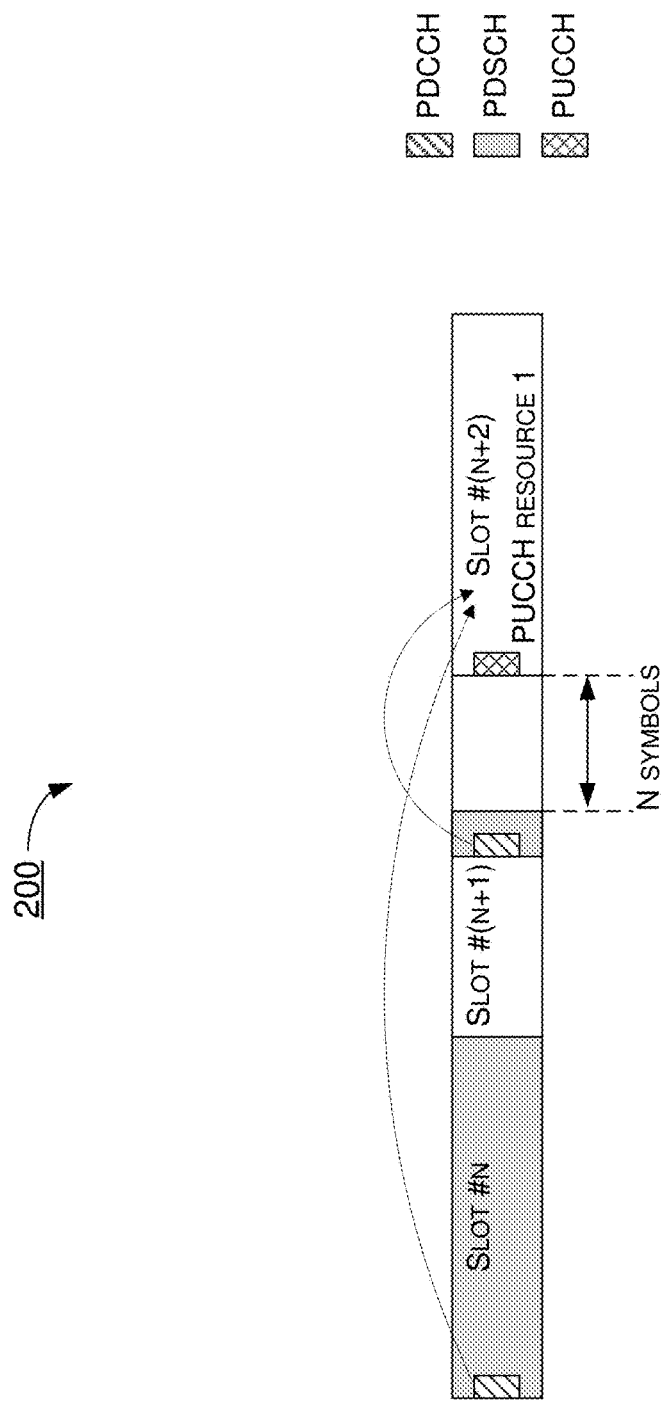
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network apparatus, which may be a part of a wireless communication network (e.g., an LTE network, an LTE-Advanced network, an LTE-Advanced Pro network, a 5G network, an NR network, an IoT network or an NB-IoT network). The network apparatus may be configured to transmit the first PDCCH in slot #n. The first PDCCH may comprise the first DCI format to schedule the first PDSCH in slot #n and the first PUCCH resource (e.g. PUCCH resource 1) in slot #(n+2). The network apparatus may further be configured to transmit the second PDCCH in slot #(n+1). The second PDCCH may comprise the second DCI format to schedule the second PDSCH in slot #(n+1) and the PUCCH resource (e.g. PUCCH resource 1) in slot #(n+2). The network apparatus may be configured to guarantee that the time period (e.g., N symbols) between the last symbol of the second PDSCH and the first symbol of the first PUCCH resource is long enough for the UE to process the downlink information and prepare the HARQ-ACK information. The UE may be configured to determine the PUCCH resource based on the PUCCH resource indicator field in the last DCI format so as to transmit the corresponding HARQ-ACK information in the PUCCH.

Specifically, the network apparatus may configure N symbols to be greater than a timing threshold. The timing threshold may be the minimum UE processing time needed for processing the downlink information and preparing the HARQ-ACK information. The network apparatus should transmit additional downlink information (e.g., PDCCH or PDSCH) earlier than the timing threshold from the first symbol of the first PUCCH resource. Thus, the UE may have enough time to multiplex the HARQ-ACK information corresponding to the additional downlink information in the first PUCCH resource.

In an event that the additional downlink information (e.g., second DCI format) is not able to be transmitted earlier than the timing threshold from the first symbol of the first PUCCH resource, the UE may deem that it is an error case. The UE may not be able to handle such error case or may ignore the additional downlink information without processing. The UE may only transmit the HARQ-ACK information corresponding to the first DCI format in the PUCCH transmission. The UE may not be expected to prepare additional HARQ-ACK bit to be multiplexed in the PUCCH transmission. Alternatively, when the network apparatus determines that the additional downlink information is not able to be transmitted earlier than the timing threshold from the first symbol of the first PUCCH resource, the network apparatus may determine to use another PUCCH resource for the HARQ-ACK information corresponding to the additional downlink information. The network apparatus may configure another PUCCH resource (e.g., a third PUCCH resource) for the additional downlink information to the UE. The UE may be configured to use the third resource of PUCCH transmission to transmit the HARQ-ACK information corresponding to the second DCI format.

Figure 3:
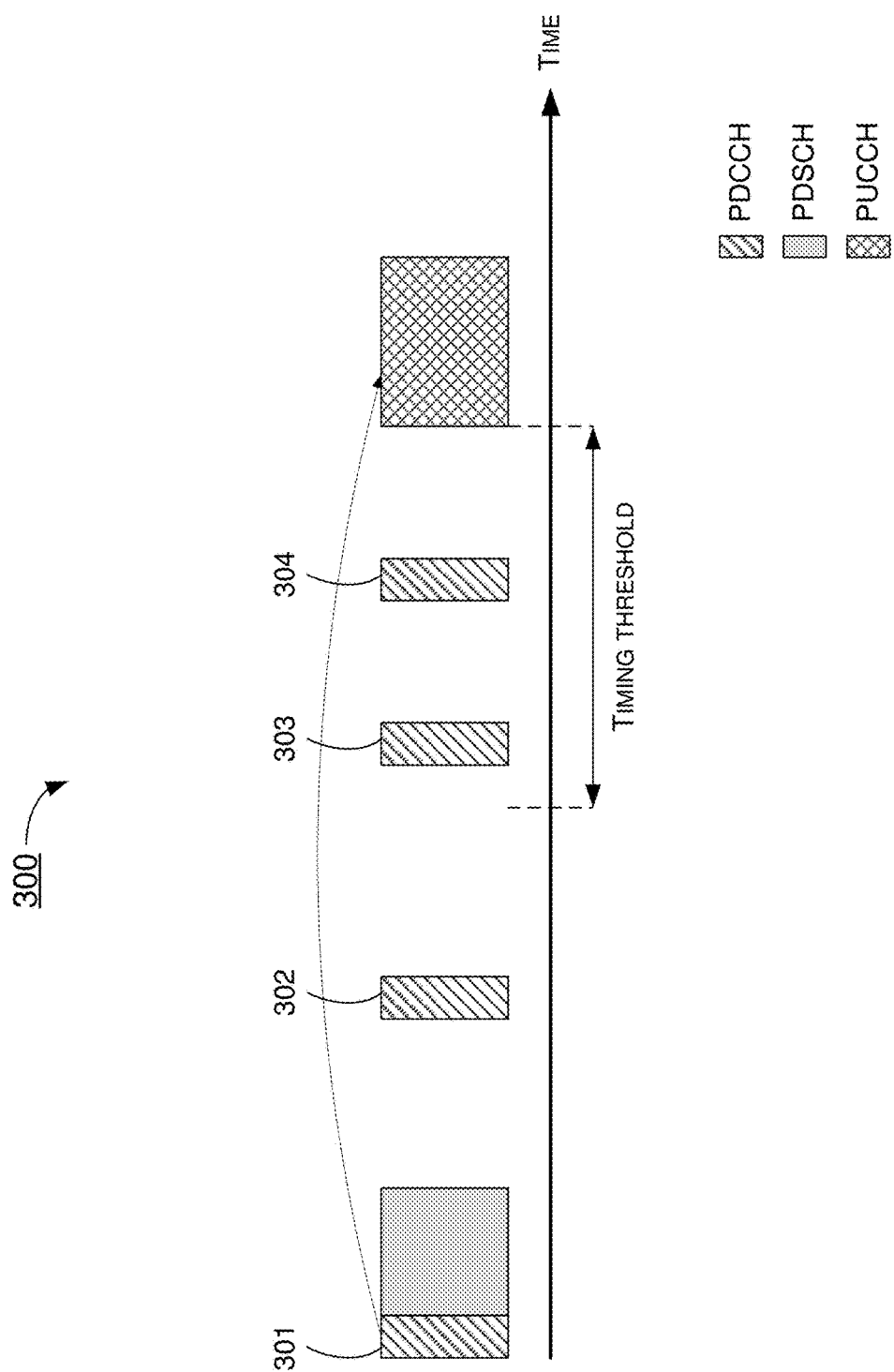
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network apparatus, which may be a part of a wireless communication network (e.g., an LTE network, an LTE-Advanced network, an LTE-Advanced Pro network, a 5G network, an NR network, an IoT network or an NB-IoT network). The UE may be configured to receive the first PDCCH (e.g., PDCCH 301) from the network apparatus. The first PDCCH may comprise the first DCI format indicating the first PDSCH and the first resource of PUCCH transmission. The first DCI format may comprise the DCI format 1_0 or the DCI format 1_1. The UE may receive the PDSCH according to the first DCI format and prepare the HARQ-ACK information corresponding to the PDSCH. The UE may be configured to transmit the HARQ-ACK information in the first resource.

The UE may further be configured to receive the second PDCCH from the network apparatus at a later time. The second PDCCH may comprise the second DCI format indicating the second PDSCH and the second resource of PUCCH transmission. The second DCI format may comprise the DCI format 1_0 or the DCI format 1_1. The second resource may be the same as or different from the first resource. The UE may be configured to determine whether the reception of the second DCI format is earlier than a timing threshold from the first resource. The timing threshold is configured for the UE to process the downlink information (e.g., PDCCH and PDSCH) and prepare the HARQ-ACK information. For example, the UE may be configured to determine whether the last symbol of the PDCCH occasion including the second DCI format is earlier than the timing threshold from the first symbol of the first resource.

In an event that the UE determines that the reception of the second DCI format is earlier than the timing threshold from the first resource, it means that the UE may have enough time to process the downlink information and prepare the HARQ-ACK information. The UE may be configured to multiplex the HARQ-ACK information corresponding to the second DCI format in the second resource of PUCCH transmission. For example, the UE may receive PDCCH 302 from the network apparatus. PDCCH 302 may comprise the second DCI format. Since PDCCH 302 is received earlier than the timing threshold from the first resource, the UE may be able to multiplex the HARQ-ACK information corresponding to the second DCI format in the PUCCH transmission.

In an event that the UE determines that the reception of the second DCI format is not earlier than the timing threshold from the first resource, it means that the UE may not have enough time to process the downlink information and prepare the HARQ-ACK information. The UE does not expect to multiplex the HARQ-ACK information corresponding to the second DCI format in the PUCCH resource in the slot. Thus, the UE may be configured to cancel multiplexing the HARQ-ACK information corresponding to the second DCI format in the PUCCH transmission. For example, the UE may receive PDCCH 303 or 304 from the network apparatus. PDCCH 303 or 304 may comprise the second DCI format. Since PDCCH 303 or 304 is not received earlier than the timing threshold from the first resource, the UE may determine not to multiplex the HARQ-ACK information corresponding to the second DCI format in the PUCCH transmission.

In some implementations, in an event that the UE determines that the receiving of the second DCI format is not earlier than the timing threshold from the first resource, the UE may be configured not to take in account the second DCI format. The UE may be configured to ignore the second DCI format. The UE may be configured not to process the downlink information (e.g., the second PDCCH or the second PDSCH). Alternatively, the UE may be configured to process the downlink information, but not to prepare or multiplex the HARQ-ACK information corresponding to the downlink information.

In some implementations, the timing threshold may comprise at least one of $N_1$ symbols, $N_2$ symbols, and $N_3$ symbols (e.g., orthogonal frequency-division multiplexing (OFDM) symbols) defined in the $3^{rd}$ Generation Partnership Project (3GPP) specifications. In some implementations, $N_1$ symbols may correspond to the UE PDSCH processing time. $N_2$ symbols may corresponds to the UE PUSCH processing time. In some implementations, $N_3$ symbols may correspond to a processing time that depends on the numerology. For example, the timing threshold may be the $N_3$ symbols. The UE may be configured to determine whether the PDCCH reception that includes the second DCI format is earlier than $N_3$ symbols from the first symbol of the first resource for PUCCH transmission. The $N_3$ symbols may be configured depending on the subcarrier spacing (SCS) configuration $\mu$. For example, for a first UE processing capability (e.g., UE processing capability 1), the $N_3$ symbols may be configured as 8 symbols for 15 kHz SCS (e.g., $\mu=0$), 10 symbols for 30 kHz SCS (e.g., $\mu=1$), 17 symbols for 60 kHz SCS (e.g., $\mu=2$), and 20 symbols for 120 kHz SCS (e.g., $\mu=3$). For a second UE processing capability (e.g., UE processing capability 2), the $N_3$ symbols may be configured as 3 symbols for 15 kHz SCS (e.g., $\mu=0$), 4.5 symbols for 30 kHz SCS (e.g., $\mu=1$), and 9 symbols for 60 kHz SCS (e.g., $\mu=2$).

In some implementations, the PDSCH processing capability (e.g., $N_1$ symbols) or the modification of $N_1$ may be used for the timing threshold. For example, the timing threshold may be ($N_1+\delta$) symbols. The value of $\delta$ may be 0, or may be a positive or negative value. The value of $\delta$ may be determined according to the minimum PDSCH duration, the duration of the PDCCH search space, the number of PDCCH blinding decoding, or any other condition or characteristics of the PDCCH/PUCCH transmission. The value of $\delta$ may also include the timing advance.

In some implementations, the PUSCH processing capability (e.g., $N_2$ symbols) or the modification of $N_2$ may be used for the timing threshold. For example, the timing threshold may be ($N_2+\delta$) symbols. The value of $\delta$ may be 0 or it may be a positive or negative value. The value of $\delta$ may be determined according to the minimum PUSCH duration, the duration of the PDCCH search space, the number of PDCCH blinding decoding, or any other condition or characteristics of the PDCCH/PUCCH transmission. The value of $\delta$ may also include the timing advance.

In some implementations, the UE may be configured not to take in account for the purpose of PUCCH resource determination based on the received DCI format. In such implementation, the UE may assume that the PUCCH resource set and the PUCCH format may not be changed according to the received DCI format (e.g., the second DCI format). In some implementations, the UE may be configured not to change the PUCCH resource set based on the received DCI format. In such implementation, only the PUCCH resource set may not be changed. In some implementations, the UE may be configured not to change the PUCCH resource set and the PUCCH format based on the received DCI format. In such implementation, both the PUCCH resource set and the PUCCH format may not be changed. In some implementations, the UE may be configured not to change the PUCCH resource allocation based on the received DCI format. In such implementation, the PUCCH resource allocation may not be changed but the PUCCH resource set and the PUCCH format may potentially be changed. In some implementations, the UE may be configured not to take in account for the purpose of PUCCH content and resource determination based on the received DCI format. In such implementation, the UE may not taken in account the received DCI format neither for the PUCCH resource allocation nor for the PUCCH content.

Illustrative Implementations

Figure 4:
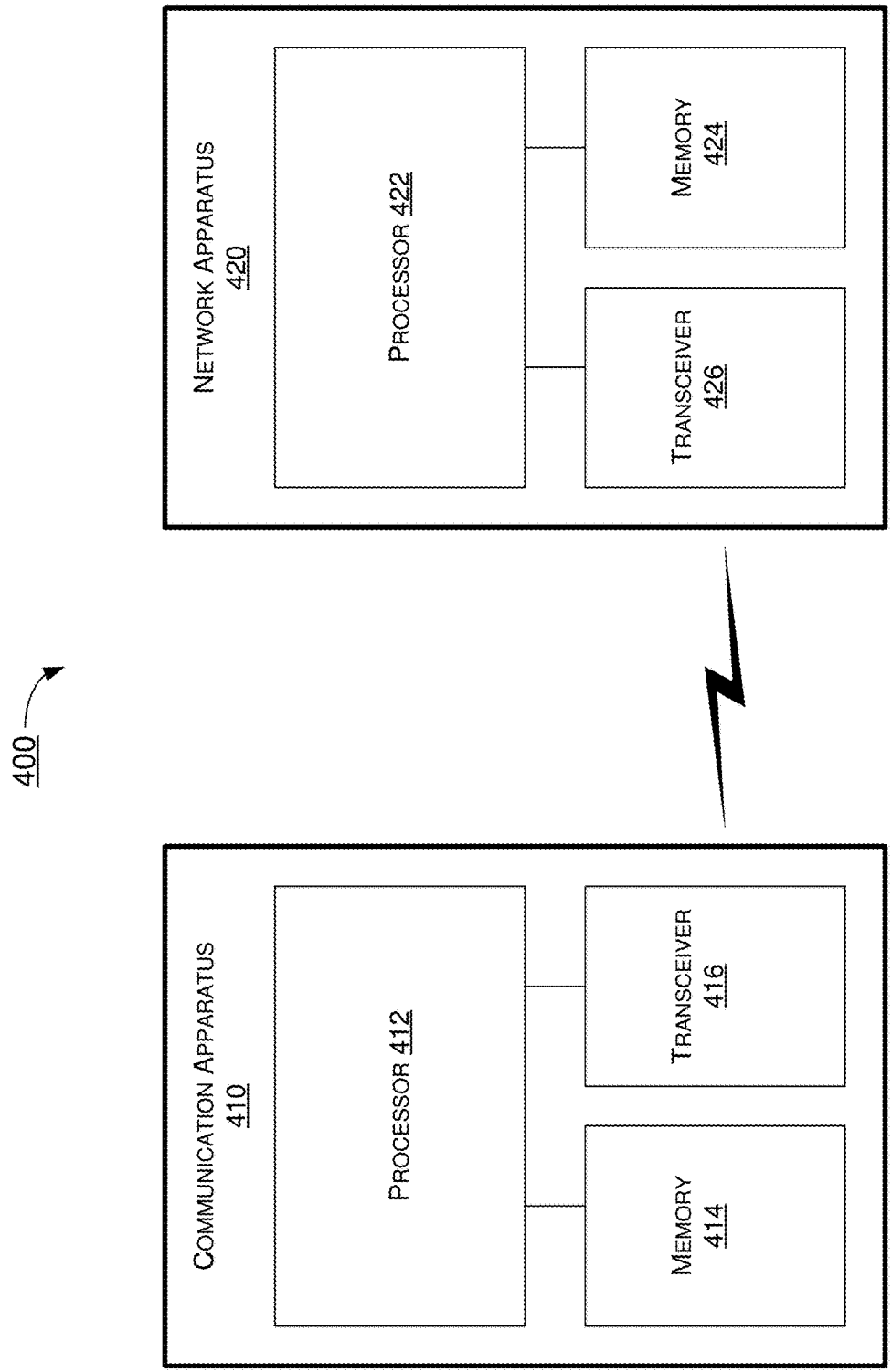
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to procedures for reporting HARQ-ACK information with respect to user equipment and network apparatus in wireless communications, including scenarios 101, 102, 200 and 300 described above as well as process 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT or NB-IoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in an LTE, LTE-Advanced or LTE-Advanced Pro network or in a gNB in a 5G, NR, IoT or NB-IoT network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more RISC or CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 622 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 422 may be configured to transmit, via transceiver 426, the first PDCCH in slot #n. The first PDCCH may comprise the first DCI format to schedule the first PDSCH in slot #n and the first PUCCH resource in slot #(n+2). Processor 422 may further be configured to transmit, via transceiver 426, the second PDCCH in slot #(n+1). The second PDCCH may comprise the second DCI format to schedule the second PDSCH in slot #(n+1) and the PUCCH resource in slot #(n+2). Processor 422 may be configured to guarantee that the time period (e.g., N symbols) between the last symbol of the second PDSCH and the first symbol of the first PUCCH resource is long enough for communication apparatus 410 to process the downlink information and prepare the HARQ-ACK information. Processor 412 may be configured to determine the PUCCH resource based on the PUCCH resource indicator field in the last DCI format so as to transmit the corresponding HARQ-ACK information in the PUCCH.

In some implementations, processor 422 may configure N symbols to be greater than a timing threshold. The timing threshold may be the minimum processing time needed for communication apparatus 410 to process the downlink information and preparing the HARQ-ACK information. Processor 422 should transmit additional downlink information (e.g., PDCCH or PDSCH) earlier than the timing threshold from the first symbol of the first PUCCH resource. Thus, processor 412 may have enough time to multiplex the HARQ-ACK information corresponding to the additional downlink information in the first PUCCH resource.

In some implementations, in an event that processor 422 does not transmit the additional downlink information (e.g., second DCI format) earlier than the timing threshold from the first symbol of the first PUCCH resource, processor 412 may deem that it is an error case. Processor 412 may not be able to handle such error case or may ignore the additional downlink information without processing. Processor 412 may only transmit, via transceiver 416, the HARQ-ACK information corresponding to the first DCI format in the PUCCH transmission. Processor 412 may not be expected to prepare additional HARQ-ACK bit to be multiplexed in the PUCCH transmission.

In some implementations, when processor 422 determines that the additional downlink information is not able to be transmitted earlier than the timing threshold from the first symbol of the first PUCCH resource, processor 422 may determine to use another PUCCH resource for the HARQ-ACK information corresponding to the additional downlink information. Processor 422 may configure another PUCCH resource (e.g., a third PUCCH resource) for the additional downlink information to communication apparatus 410. Processor 412 may be configured to use the third resource of PUCCH transmission to transmit the HARQ-ACK information corresponding to the second DCI format.

In some implementations, processor 412 may be configured to receive, via transceiver 416, the first PDCCH from network apparatus 420. The first PDCCH may comprise the first DCI format indicating the first PDSCH and the first resource of PUCCH transmission. The first DCI format may comprise the DCI format 1_0 or the DCI format 1_1. Processor 412 may receive the PDSCH according to the first DCI format and prepare the HARQ-ACK information corresponding to the PDSCH. Processor 412 may be configured to transmit, via transceiver 416, the HARQ-ACK information in the first resource.

In some implementations, processor 412 may further be configured to receive, via transceiver 416, the second PDCCH from network apparatus 420 at a later time. The second PDCCH may comprise the second DCI format indicating the second PDSCH and the second resource of PUCCH transmission. The second DCI format may comprise the DCI format 1_0 or the DCI format 1_1. The second resource may be the same as or different from the first resource. Processor 412 may be configured to determine whether the receiving of the second DCI format is earlier than a timing threshold from the first resource. The timing threshold is configured for communication apparatus 410 to process the downlink information (e.g., PDCCH and PDSCH) and prepare the HARQ-ACK information. For example, processor 412 may be configured to determine whether the last symbol of the PDCCH occasion including the second DCI format is earlier than the timing threshold from the first symbol of the first resource.

In some implementations, in an event that processor 412 determines that the receiving of the second DCI format is earlier than the timing threshold from the first resource, it means that processor 412 may have enough time to process the downlink information and prepare the HARQ-ACK information. Processor 412 may be configured to multiplex the HARQ-ACK information corresponding to the second DCI format in the second resource of PUCCH transmission.

In some implementations, in an event that processor 412 determines that the receiving of the second DCI format is not earlier than the timing threshold from the first resource, it means that processor 412 may not have enough time to process the downlink information and prepare the HARQ-ACK information. Processor 412 does not expect to multiplex the HARQ-ACK information corresponding to the second DCI format in the PUCCH resource in the slot. Thus, processor 412 may be configured to cancel multiplexing the HARQ-ACK information corresponding to the second DCI format in the PUCCH transmission.

In some implementations, in an event that processor 412 determines that the receiving of the second DCI format is not earlier than the timing threshold from the first resource, processor 412 may be configured not to take in account the second DCI format. Processor 412 may be configured to ignore the second DCI format. Processor 412 may be configured not to process the downlink information (e.g., the second PDCCH or the second PDSCH). Alternatively, processor 412 may be configured to process the downlink information, but not to prepare or multiplex the HARQ-ACK information corresponding to the downlink information.

In some implementations, processor 412 may be configured not to take in account for the purpose of PUCCH resource determination based on the received DCI format. In such implementation, processor 412 may assume that the PUCCH resource set and the PUCCH format may not be changed according to the received DCI format (e.g., the second DCI format). In some implementations, processor 412 may be configured not to change the PUCCH resource set based on the received DCI format. In such implementation, only the PUCCH resource set may not be changed. In some implementations, processor 412 may be configured not to change the PUCCH resource set and the PUCCH format based on the received DCI format. In such implementation, both the PUCCH resource set and the PUCCH format may not be changed. In some implementations, processor 412 may be configured not to change the PUCCH resource allocation based on the received DCI format. In such implementation, the PUCCH resource allocation may not be changed but the PUCCH resource set and the PUCCH format may potentially be changed. In some implementations, processor 412 may be configured not to take in account for the purpose of PUCCH content and resource determination based on the received DCI format. In such implementation, processor 412 may not taken in account the received DCI format neither for the PUCCH resource allocation nor for the PUCCH content.

Illustrative Processes

Figure 5:
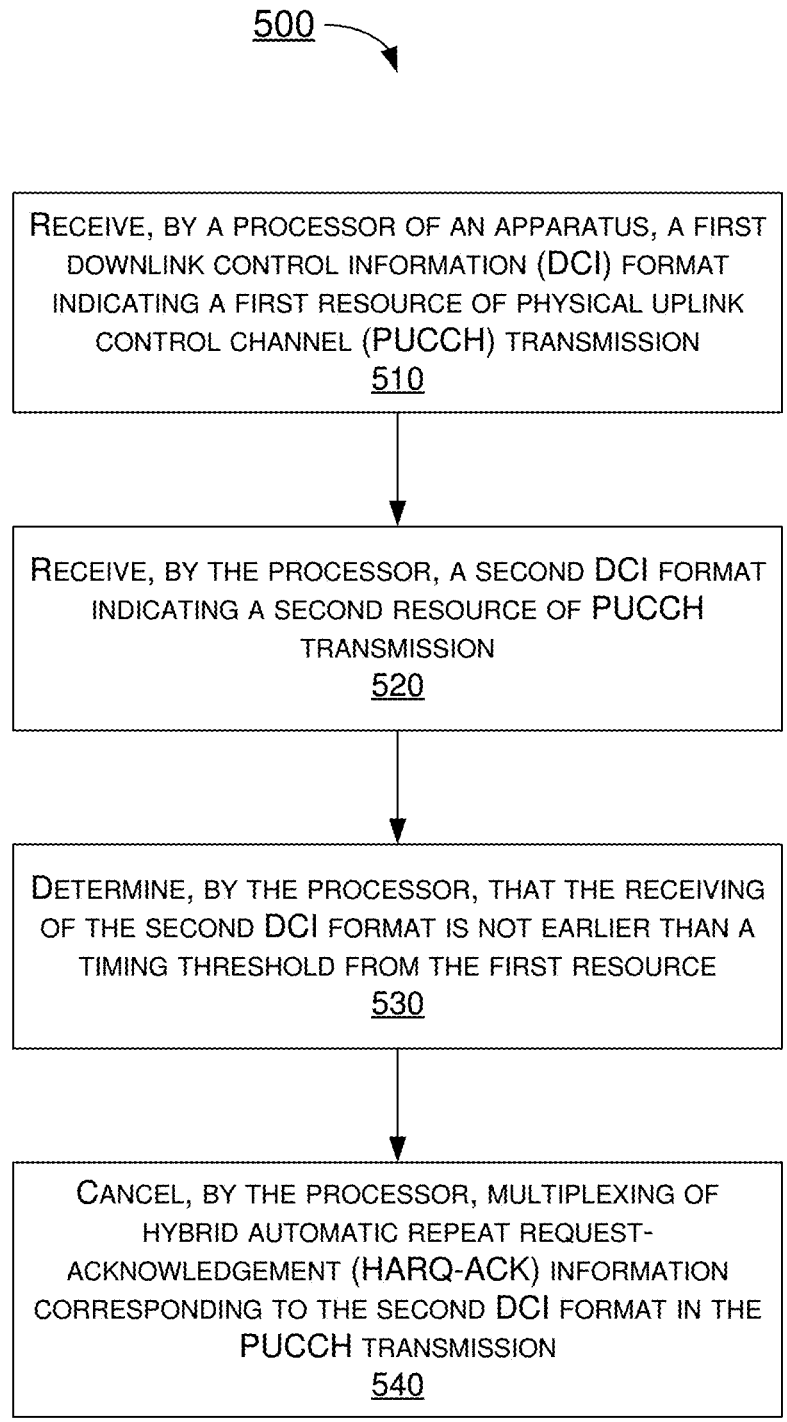
FIG. 5 is a flowchart of an example process in accordance with an implementation of the present disclosure.

FIG. 5 illustrates an example process 500 in accordance with an implementation of the present disclosure. Process 500 may be an example implementation of scenarios 101, 102, 200 and 300, whether partially or completely, with respect to procedures for reporting HARQ-ACK information with the present disclosure. Process 500 may represent an aspect of implementation of features of communication apparatus 410. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve processor 412 of apparatus 410 receiving a first DCI format indicating a first resource of PUCCH transmission. Process 500 may proceed from 510 to 520.

At 520, process 500 may involve processor 412 receiving a second DCI format indicating a second resource of PUCCH transmission. Process 500 may proceed from 520 to 530.

At 530, process 500 may involve processor 412 determining that the receiving of the second DCI format is not earlier than a timing threshold from the first resource. Process 500 may proceed from 530 to 540.

At 540, process 500 may involve processor 412 cancelling multiplexing of HARQ-ACK information corresponding to the second DCI format in the PUCCH transmission.

In some implementations, at least one of the first DCI format and the second DCI format may comprise a DCI format 1_0 or a DCI format 1_1.

In some implementations, the timing threshold may comprise at least one of $N_1$ symbols, $N_2$ symbols, and $N_3$ symbols.

In some implementations, the timing threshold may comprise at least one of 8 symbols, 10 symbols, 17 symbols, and 20 symbols corresponding to a first processing capability.

In some implementations, the timing threshold may comprise at least one of 3 symbols, 4.5 symbols and 9 symbols corresponding to a second processing capability.

In some implementations, process 500 may involve processor 412 determining that a last symbol of a PDCCH occasion including the second DCI format is not earlier than the timing threshold from a first symbol of the first resource.

In some implementations, process 500 may involve processor 412 ignoring the second DCI format.

In some implementations, process 500 may involve processor 412 using a third resource of PUCCH transmission to transmit the HARQ-ACK information corresponding to the second DCI format.

In some implementations, process 500 may involve processor 412 transmitting the HARQ-ACK information corresponding to the first DCI format in the PUCCH transmission.

In some implementations, the second resource may be different from the first resource.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, a first downlink control information (DCI) format indicating a first resource of physical uplink control channel (PUCCH) transmission;
receiving, by the processor after receiving the first DCI format, a second DCI format indicating a second resource of PUCCH transmission;
determining, by the processor, whether the second DCI format is received at least a timing threshold before the first resource; and
cancelling, by the processor, multiplexing of hybrid automatic repeat request-acknowledgement (HARQ-ACK) information corresponding to the second DCI format in the PUCCH transmission responsive to determining that a time at which the second DCI format is received is not at least the timing threshold before the first resource.

2. The method of claim 1, wherein at least one of the first DCI format and the second DCI format comprises a DCI format 1_0 or a DCI format 1_1.

3. The method of claim 1, wherein the timing threshold comprises at least one of $N_1$ symbols, $N_2$ symbols, and $N_3$ symbols.

4. The method of claim 1, wherein the timing threshold comprises at least one of 8 symbols, 10 symbols, 17 symbols, and 20 symbols corresponding to a first processing capability.

5. The method of claim 1, wherein the timing threshold comprises at least one of 3 symbols, 4.5 symbols and 9 symbols corresponding to a second processing capability.

6. The method of claim 1, wherein the determining comprises determining that a last symbol of a physical downlink control channel (PDCCH) occasion including the second DCI format is not earlier than the timing threshold from a first symbol of the first resource.

7. The method of claim 1, further comprising:
ignoring, by the processor, the second DCI format.

8. The method of claim 1, further comprising:
using, by the processor, a third resource of PUCCH transmission to transmit the HARQ-ACK information corresponding to the second DCI format.

9. The method of claim 1, further comprising:
transmitting, by the processor, the HARQ-ACK information corresponding to the first DCI format in the PUCCH transmission.

10. The method of claim 1, wherein the second resource is different from the first resource.

11. An apparatus, comprising:
a transceiver capable of wirelessly communicating with a network node of a wireless network; and
a processor communicatively coupled to the transceiver, the processor capable of:
receiving, via the transceiver, a first downlink control information (DCI) format indicating a first resource of physical uplink control channel (PUCCH) transmission;

receiving, via the transceiver after receiving the first DCI format, a second DCI format indicating a second resource of PUCCH transmission;

determining whether the second DCI format is received at least a timing threshold before the first resource; and cancelling multiplexing of hybrid automatic repeat request-acknowledgement (HARQ-ACK) information corresponding to the second DCI format in the PUCCH transmission responsive to determining that a time at which the second DCI format is received is not at least the timing threshold before the first resource.

12. The apparatus of claim 11, wherein at least one of the first DCI format and the second DCI format comprises a DCI format 1_0 or a DCI format 1_1.

13. The apparatus of claim 11, wherein the timing threshold comprises at least one of $N_1$ symbols, $N_2$ symbols, and $N_3$ symbols.

14. The apparatus of claim 11, wherein the timing threshold comprises at least one of 8 symbols, 10 symbols, 17 symbols, and 20 symbols corresponding to a first processing capability.

15. The apparatus of claim 11, wherein the timing threshold comprises at least one of 3 symbols, 4.5 symbols and 9 symbols corresponding to a second processing capability.

16. The apparatus of claim 11, wherein, in determining that the receiving of the second DCI format is not earlier than a timing threshold from the first resource, the processor is capable of determining that a last symbol of a physical downlink control channel (PDCCH) occasion including the second DCI format is not earlier than the timing threshold from a first symbol of the first resource.

17. The apparatus of claim 11, wherein the processor is further capable of:

ignoring the second DCI format.

18. The apparatus of claim 11, wherein the processor is further capable of:

using a third resource of PUCCH transmission to transmit the HARQ-ACK information corresponding to the second DCI format.

19. The apparatus of claim 11, wherein the processor is further capable of:

transmitting, via the transceiver, the HARQ-ACK information corresponding to the first DCI format in the PUCCH transmission.

20. The apparatus of claim 11, wherein the second resource is different from the first resource.

* * * * *